3,194,772
PROCESS FOR COPOLYMERIZING TETRAHYDROFURAN WITH AN EPOXIDE MONOMER
Samuel I. Trotz, New Haven, Conn., assignor to Olin Mathieson Chemical Corporation, a corporation of Virginia
No Drawing. Filed Sept. 21, 1962, Ser. No. 225,365
9 Claims. (Cl. 260—2)

This invention relates to novel polymers and in particular to novel copolymers prepared from cyclic ethers and to a process for their preparation in which the compound $B_{10}H_{10}[C(COCl)]_2$ is employed as a catalyst.

Numerous references are found in the art in which the preparation of polymers of such cyclic ethers as tetrahydrofuran is described. Tetrahydrofuran polymers have been prepared with a wide variety of catalyst such as fluosulfonic acid, pyrosulfuric acid, ferric chloride, aluminum chloride, tin tetrachloride, etc. For the most part the products obtained were oily liquids. In contrast, by the process of this invention copolymers of tetrahydrofuran with other cyclic ethers have been prepared which range from viscous liquids to solid materials.

The compound $B_{10}H_{10}[C(COCl)]_2$ which is used as a catalyst in the novel process of this invention, can be prepared conveniently according to the method described in John W. Ager, Jr., et al. application Serial No. 851,469, filed November 6, 1959 (now U.S. Patent 3,109,026). For example, the novel catalyst can be prepared by refluxing a mixture of $B_{10}H_{10}[C(COOH)]_2$ phosphorus pentachloride and carbon tetrachloride for a period of about 7 hours while chlorine is bubbled through the reaction mixture.

It has been found that tetrahydrofuran can be copolymerized with a compound selected from the group consisting of ethylene oxide, propylene oxide, beta-propiolactone, or vinylcyclohexene dioxide, by bringing the mixture of cyclic ethers into contact with the novel catalyst or by bringing a preformed complex of tetrahydrofuran with the $B_{10}H_{10}[C(COCl)]_2$ catalyst into contact with the cyclic ether mixture.

The quantity of the catalyst employed can be varied widely from about 0.001 to 5.0 percent based on the weight of the mixture of cyclic ethers utilized. Preferably, from about 0.01 to about 1.0 percent of the $B_{10}H_{10}[C(COCl)]_2$ based on the weight of mixture of cyclic ethers being copolymerized, is utilized in the novel process of this invention. In a like manner, the temperature at which the polymerization process of this invention is carried out can be varied over a wide range. Generally, the polymerization is conducted in a range between about −10° C. and +150° C. The quantity of tetrahydrofuran utilized in the preparation of the novel copolymers of this invention can be varied widely and generally will be from about 5 to about 70 percent based on the weight of the ether mixture being copolymerized.

If desired, aromatic and aliphatic hydrocarbons can be employed as solvents and diluents in carrying out the copolymerization of the cyclic ethers according to the process of this invention. The use of the solvent or diluent permits a greater degree of control over the reaction temperature by providing for the dissipation of heat during the polymerization reaction.

The compound $B_{10}H_{10}[C(COCl)]_2$ is a particularly advantageous catalyst in that it is highly effective in very low concentrations. It is an easily purified crystalline material which has a long shelf life and relatively good stability in the presence of air and moisture. This novel catalyst is effective in producing copolymers from binary mixtures of cyclic ethers which range from viscous liquids to solid materials.

The copolymers produced by the process of this invention are useful as plasticizers for high molecular weight polymers and as lubricants. From solutions of the solid copolymer products prepared by the process of this invention films can be prepared which exhibit outstanding durability, toughness and good adhesion.

Temperature reversible emulsion systems which are useful in well drilling operations can be prepared with the valuable copolymers of this invention. Such copolymer in water emulsions can be formed by dispersing from 15 to 40 percent of the copolymer (based on the total weight of the polymer and water) in finely divided form in water at ambient temperature. When an emulsion system of this type, which has a low viscosity at wellhead temperature and consequently is easily pumped, is circulated down the tubing to the drilling point, the emulsion system reverses at the high bottom hole temperature becoming an oil in water emulsion with a much higher viscosity in which rock chips, etc. can be conveniently carried to the surface by the circulating fluid.

The invention is described in greater detail in the following specific examples which are illustrative and not intended to limit the scope of the invention.

*Example I*

To 90 parts of tetrahydrofuran and 10 parts of beta-propiolactone there was added 0.10 part of $$B_{10}H_{10}[C(COCl)]_2$$

at room temperature. This reaction mixture was maintained at 25° C. for 6 hours and then was allowed to remain at room temperature for 24 hours. The resulting solid gel was dissolved in tetrahydrofuran and precipitated in a large volume of distilled water. After washing several times with distilled water, the polymer was boiled with water for several hours and upon cooling a low melting, solid polymeric product resulted which was dried in a vacuum oven for several hours. Based on the combined weight of the tetrahydrofuran and propiolactone charged to the reactor conversion to the polymer product was 75 percent. This copolymer was observed to have excellent emulsifying properties.

*Example II*

To 90 parts of tetrahydrofuran and 10 parts of propylene oxide there was added 0.15 part of $$B_{10}H_{10}[C(COCl)]_2$$

at room temperature. The reaction mixture was then allowed to remain at room temperature for 24 hours and during this time it polymerized to a clear, viscous liquid which was purified in the same manner as described in Example I. Based on the total weight of the tetrahydrofuran and the propylene oxide charged to the reactor a conversion of 55 percent was obtained. The resulting viscous liquid product solidified at 5° C.

*Example III*

To 50 parts of tetrahydrofuran and 50 parts of propylene oxide there was added 0.15 part of $$B_{10}H_{10}[C(COCl)]_2$$

at room temperature. It was observed that the mixture polymerized very rapidly to a viscous liquid on addition of the catalyst. The reaction mixture was allowed to remain at room temperature for 24 hours. After purification, which was carried out in the same manner as described in Example I, the resulting viscous, liquid, polymeric product recovered represented a conversion of 50 percent based on the combined weight of the tetrahydrofuran and propylene oxide added initially to the reactor.

*Example IV*

To 95 parts of tetrahydrofuran and 5 parts of vinylcyclohexene dioxide there was added 0.15 part of $$B_{10}H_{10}[C(COCl)]_2$$

at room temperature. It was observed that the reaction mixture polymerized very rapidly to a solid gel which when recovered and purified in the manner described in Example I was a brittle solid.

What is claimed is:

1. A process for the production of copolymers which comprises copolymerizing tetrahydrofuran with a compound selected from the group consisting of ethylene oxide, propylene oxide, beta-propiolactone and vinylcyclohexene dioxide, in the presence of $B_{10}H_{10}[C(COCl)]_2$.

2. The process of claim 1 in which the quantity of $B_{10}H_{10}[C(COCl)]_2$ employed is from about 0.001 to 5.0 percent by weight based on the combined weight of the tetrahydrofuran and the said compound.

3. The process of claim 1 in which the said compound is propylene oxide.

4. The process of claim 1 in which the said compound is beta-propiolactone.

5. The process of claim 1 in which the said compound is vinylcyclohexene dioxide.

6. The process for the production of copolymers which comprises copolymerizing tetrahydrofuran with propylene oxide in the presence of from about 0.001 to 5.0 percent by weight of $B_{10}H_{10}[C(COCl)]_2$ based on the combined weight of the tetrahydrofuran and the propylene oxide.

7. The process for the production of copolymers which comprises copolymerizing tetrahydrofuran with beta-propiolactone in the presence of from about 0.001 to 5.0 percent by weight of $B_{10}H_{10}[C(COCl)]_2$ based on the combined weight of the tetrahydrofuran and the beta-propiolactone.

8. The process for the production of copolymers which comprises copolymerizing tetrahydrofuran with vinylcyclohexene dioxide in the presence of from about 0.001 to 5.0 percent of $B_{10}H_{10}[C(COCl)]_2$ based on the combined weight of the tetrahydrofuran and the vinylcyclohexene dioxide.

9. The copolymer produced by the process of claim 7.

References Cited by the Examiner

UNITED STATES PATENTS 2,870,100  1/59  Stewart et al. _____ 260—2
3,063,965  11/62  Calclough _____ 260—2

FOREIGN PATENTS 914,438  7/54  Germany.

WILLIAM H. SHORT, *Primary Examiner.*